United States Patent
Sowa et al.

(10) Patent No.: US 9,871,796 B1
(45) Date of Patent: Jan. 16, 2018

(54) MULTI LEVEL DECOMPOSITION FOR MULTI USER CAX DATABASES

(71) Applicant: United Technologies Corporation, Hartford, CT (US)

(72) Inventors: William A. Sowa, Simsbury, CT (US); Charles Gregory Jensen, Provo, UT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 84 days.

(21) Appl. No.: 14/617,994

(22) Filed: Feb. 10, 2015

Related U.S. Application Data (60) Provisional application No. 61/938,203, filed on Feb. 11, 2014.

(51) Int. Cl.
| | |
|---|---|
| *H04L 29/06* | (2006.01) |
| *H04L 29/08* | (2006.01) |
| *G06F 21/62* | (2013.01) |
| *G06F 17/50* | (2006.01) |

(52) U.S. Cl.
CPC ........... *H04L 63/101* (2013.01); *G06F 17/50* (2013.01); *G06F 21/6218* (2013.01); *H04L 67/30* (2013.01)

(58) Field of Classification Search
CPC .... H04L 63/101; H04L 67/30; G06F 21/6218
USPC ............................................................ 726/5
See application file for complete search history.

(56) References Cited

U.S. PATENT DOCUMENTS

| | | | |
|---|---|---|---|
| 6,161,113 A * | 12/2000 | Mora .................... | G06Q 10/10 715/234 |
| 8,229,715 B1 | 7/2012 | Teller et al. | |
| 8,566,066 B2 | 10/2013 | Thompson et al. | |
| 2002/0035451 A1* | 3/2002 | Rothermel ............. | G06F 17/50 703/1 |
| 2004/0019799 A1* | 1/2004 | Vering ................ | G06F 21/6218 726/1 |
| 2008/0141334 A1* | 6/2008 | Wicker .................. | G06F 17/50 726/1 |
| 2010/0042676 A1* | 2/2010 | Seroussi ............. | G06F 17/5004 709/203 |

(Continued)

OTHER PUBLICATIONS

Mensah F, Teng C (2013) Security mechanisms for multi-user collaborative CAx. In: Proceedings of the 2nd annual conference research information technology (RIIT '13), 59-60.*

(Continued)

*Primary Examiner* — Matthew Henning
(74) *Attorney, Agent, or Firm* — Carlson, Gaskey & Olds, P.C.

(57) ABSTRACT

A system for collaborating on a component a first multi-user CAx environment including a data module. The first multi-user CAx environment corresponds to a first profile. The data module is configured to access data relating to a component design in a database. The database relates to a group of function-based commands. A synchronization module is configured to cause the data module to access at least one work area relating to the component design according to one of at least three access levels when at least one predetermined criterion is met, and another one of the at least three access levels when the at least one predetermined criterion is not met. A method for designing a component is also disclosed.

21 Claims, 4 Drawing Sheets

(56) References Cited

U.S. PATENT DOCUMENTS

| | | | |
|---|---|---|---|
| 2012/0131581 A1* | 5/2012 | Zielinski | G06Q 10/10 718/100 |
| 2012/0317497 A1* | 12/2012 | Red | G06F 17/50 715/751 |
| 2013/0144566 A1 | 6/2013 | De Biswas | |
| 2014/0222387 A1 | 8/2014 | Cannon et al. | |
| 2014/0222919 A1 | 8/2014 | Nysetvold et al. | |
| 2014/0278269 A1* | 9/2014 | Winn | G06F 17/50 703/1 |

OTHER PUBLICATIONS

Kim, S. et al. 2011. A Feature-Based Modeling Approach for Building Hybrid Access Control Systems. 2011 Fifth International Conference on Secure Software Integration and Reliability Improvement. (Jun. 2011), 88-97.*

T. Kim, C. Cera, W. Regli, H. Choo, J. Han. Multi-Level modeling and access control for data sharing in collaborative design. Advanced Engineering Informatics 20 (2006) 47-57.*

Xu, Yue. (2010). A Flexible Context Architecture for a Multi-User GUI. Department of Mechanical Engineering, Brigham Young University, Dec. 2010.

Red, E., French, D., Hepworth, A., Jensen, G., Stone, B. (2014). Multi-User Computer-Aided Design and Engineering Software Applications. Cloud-Based Design and Manufacturing (CBDM), Springer International Publishing, Jan. 1, 2014, pp. 25-62.

Red, E., Jensen, G., Ryskamp, J., Mix, K. (2010). NXConnect: Multi-User CAx on a Commercial Engineering Software Application. Department of Mechanical Engineering, Brigham Young University.

* cited by examiner

MULTI LEVEL DECOMPOSITION FOR MULTI USER CAX DATABASES

CROSS-REFERENCE TO RELATED APPLICATIONS

This application claims the benefit of U.S. Provisional Application 61/938,203, filed Feb. 11, 2014.

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a first multi-user CAx environment including a data module, a display module and an editing module. The first multi-user CAx environment corresponds to a first profile. The data module is configured to access data relating to a component design in a database. The database relates to a group of function-based commands. The editing module is configured to edit data corresponding to the component design, and the display module is configured to display data corresponding to the component design. A synchronization module is configured to cause the data module to access at least one work area relating to the component design according to one of at least three access levels when at least one predetermined criterion is met, and another one of the at least three access levels when the at least one predetermined criterion is not met.

In a further embodiment of any of the foregoing embodiments, the at least one work area is at least partially based on at least one geometrical selector.

A further embodiment of any of the foregoing embodiments includes a database configured to store data relating to the at least one work area according to the at least three access levels.

In a further embodiment of any of the foregoing embodiments, the at least one predetermined criterion is at least partially based on an access list, and the first profile is characterized by the access list.

In a further embodiment of any of the foregoing embodiments, data in the at least one work area is stored remotely from the computing device.

In a further embodiment of any of the foregoing embodiments, a second multi-user CAx environment is configured to execute the synchronization module.

In a further embodiment of any of the foregoing embodiments, the predetermined criterion is at least partially based on at least one of the group of function-based commands, a part identifier, and an assembly identifier each characterizing the component design.

In a further embodiment of any of the foregoing embodiments, the at least one work area and the at least one predetermined criterion are at least partially based on the group of function-based commands.

In a further embodiment of any of the foregoing embodiments, the at least three access levels includes a first level, a second level and a third level. The first level is no access to the work area, the second level is read only access to the work area, and the third level is write access to the work area.

In a further embodiment of any of the foregoing embodiments, the at least one work area includes a first area and a second area. The first profile is associated with one of the at least three access levels for the first area and another one of the at least three access levels for the second area.

In a further embodiment of any of the foregoing embodiments, the at least three access levels includes at least a fourth level and a fifth level. The fourth level is write access to the first area and the second area, and the fifth level is full access to each of the at least one work area.

A system for collaborating on a component according to an example of the present disclosure includes a host server including a processor and a memory storage device. The processor is configured to execute a host multi-user CAx environment having a synchronization module. At least one database in the memory storage device is operable to store data relating to a component design. The component design is partitioned into at least one work area. The synchronization module is configured to cause at least one client multi-user CAx environment to interact with the at least one work area according to one of at least three access levels.

In a further embodiment of any of the foregoing embodiments, the at least three access levels includes a first level, a second level and a third level. The first level is no access to the at least one work area, the second level is read only access to the at least one work area, and the third level is write access to the at least one work area.

In a further embodiment of any of the foregoing embodiments, at least one work area includes a first area and a second area, and the at least one client multi-user CAx environment is associated with one of the at least three access levels for the first area and another one of the at least three access levels for the second area.

In a further embodiment of any of the foregoing embodiments, the at least three access levels includes at least a fourth level and a fifth level. The fourth level is write access to the first area and the second area, and the fifth level is full access to each of the at least one work area.

In a further embodiment of any of the foregoing embodiments, the at least one database is configured to store data relating to the at least one work area according to the at least three access levels.

In a further embodiment of any of the foregoing embodiments, the at least one work area includes a first portion and a second portion. The synchronization module is configured to cause at least one client multi-user CAx environment to access the second portion according to one of at least three access levels corresponding to the first portion.

A method for designing a component according to an example of the present disclosure includes the steps of: a) accessing at least one work area in a database according to one of at least three access levels, the work area relating to a component design; b) displaying on an output device the component design in a multi-user CAx environment; and c) displaying on the output device the at least one work area in the multi-user CAx environment based upon the at least three access levels.

In a further embodiment of any of the foregoing embodiments, the at least three access levels includes a first level, a second level and a third level. The first level is no access to the at least one work area, the second level is read only access to the at least one work area, and the third level is write access to the at least one work area.

A further embodiment of any of the foregoing embodiments includes accessing a first portion of the at least one work area according to a first one of the at least three access levels and accessing a second portion of the at least one work area according to a second one of the at least three access levels.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
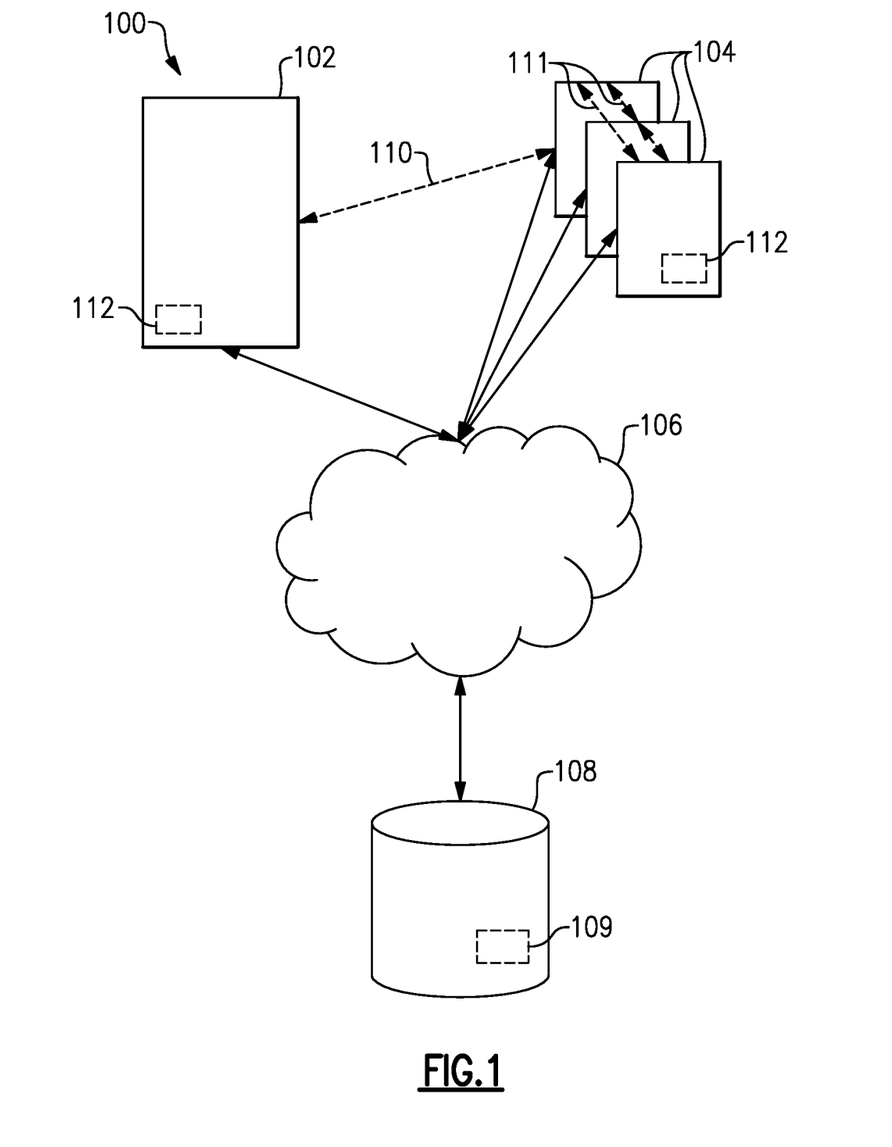
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for embodiment. Accordingly, it may be desirable to limit access to aspects of a component design depending on the level(s) of access provided to a particular user profile. In some embodiments, each user profile corresponds to one or more access lists setting the level(s) of access for each user profile.

Figure 2A:
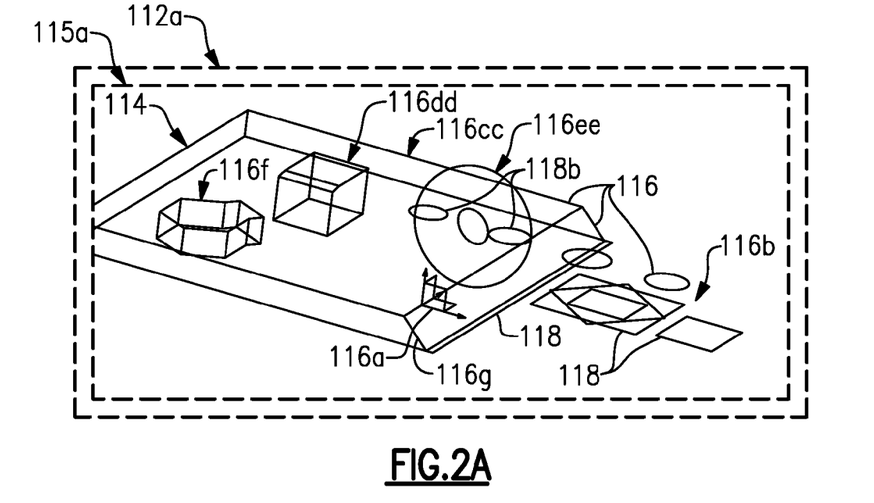
FIG. 2A illustrates a sample component design displayed in a first CAx environment, according to an embodiment.
Figure 2B:
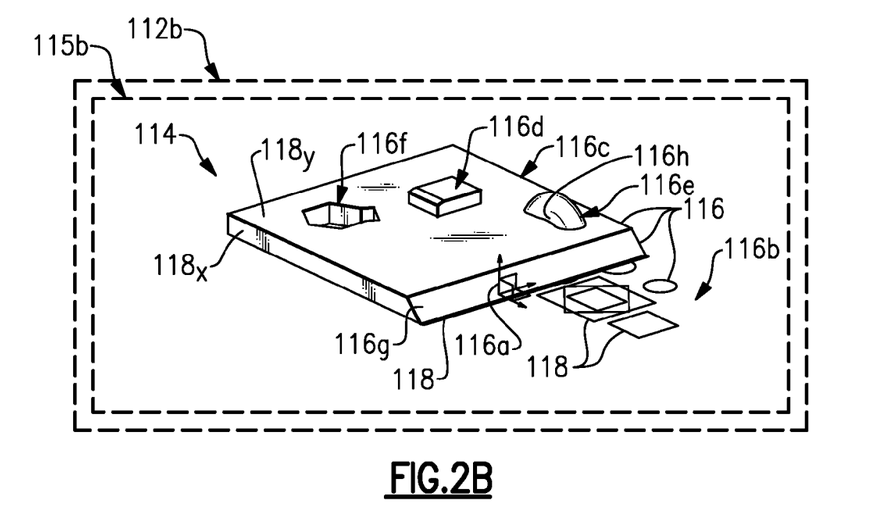
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The sample component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

In general, a multi-user CAx system, such as schematically shown in FIG. 1 at 100, does not have the capability to have multi-level decomposition of the database 109. The term "decomposition" refers to various levels of access that are utilized to access a work area or another portion of the database. Currently, there is an ability to create walls or boundaries for specific users, but in general, there have only been two options. A user is either allowed to manipulate data within a work area or they cannot. However, there may be situations where finer gradiation of authorization would prove valuable. Thus, this disclosure provides a number of different levels of authorization within the design space or work area.

In some embodiments, a particular user provided with a CAx environment 112 may not have the ability to manipulate or change what is contained in a specific work area or volume, but may have an intermediate right to do work in this volume. This right to do work does not change or alter the design that can be assigned to specific users, and may not be provided to all users. This type of capability can, in one embodiment, be provided in a five level approach. In alternative embodiments, alternative numbers of levels can be utilized such as a four level approach including any of the levels discussed herein.

Figure 3:
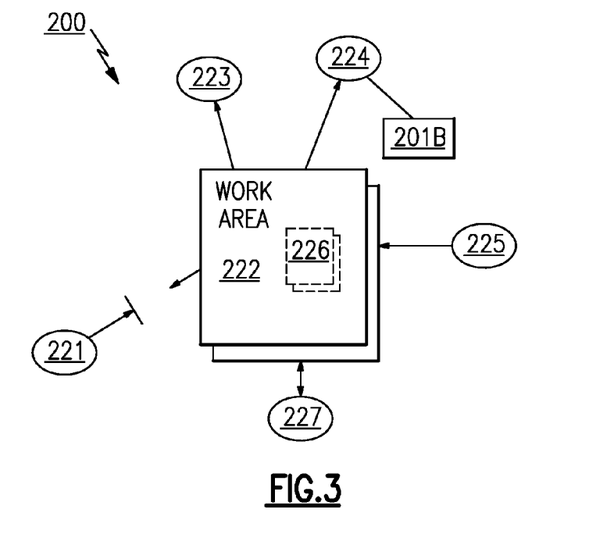
FIG. 3 illustrates a work area having multiple access levels, according to an embodiment.

FIG. 3 illustrates an embodiment 200 of controlling access to a design space or work area of a component design. In this embodiment, access to a component design 114 is controlled utilizing at least five access levels. In a first level, a user may be denied all access to a prohibited work area including viewing aspects of the component design 114 or other related content. This is shown in FIG. 3 as a user 221 not having any ability to access a work area 222. The term "work area" refers to one or more feature types, a component design 114, one or more features 116 of the component design 114, and/or one or more spatial regions including at least a portion of the component design 114. The spatial region(s) may be defined by one or more coordinates, datum planes, or geometrical volumes, for example.

In a second level, a second user 223 may be provided with the ability to "see" or visualize information from work area 222. However, the second user 223 is provided no ability to manipulate or change this information in the work area 222. In a third level, a third user 224 may be able to copy portions of the definition for re-use in a part of the design space that the third user 224 is allowed to manipulate. This is shown schematically as copied material 201B. In one illustrative embodiment, the third user 224 is able to copy one or more features 116 to reuse in another area of a component design 114. In a fourth level, a fourth user 225 is allowed to edit or manipulate a portion 226 of the work area 222 that may cross boundaries, such as a datum plane or a particular feature or sub-feature.

In a fifth level, a fifth user 227 may have unrestricted access or a complete ability to work within the work area 222. However, the portion 226 may cross work assignment or work responsibility areas between users 225 and 227. Thus, fourth user 225 is provided access to this portion 226, such that both users 225 and 227 are able to edit or manipulate the portion 226 of the work area 222. The fifth user 227 may also change or adjust the level(s) of access depending on the particular situation. The ability to provide the restrictions is within the skill of a worker in this art. However, the provision of these variable levels has not been utilized in the prior art.

Various techniques for indicating the levels of access are contemplated. In some embodiments, a multi-user CAx server or administrator, or one or more users provided with a CAx environment 112, is able to manually select one or more level(s) of access for each component design 114, feature 116, feature type, part file, and/or assembly, for example. In other embodiments, the one or more level(s) of access are predetermined or otherwise automatically set according to one or more predetermined criterion or rules. In some embodiments, the rules defining the one or more levels of access correspond to an access level of the user or CAx environment 112, and are set to default to some particular level of access, such as no access, read only access, full access, or the like. In one embodiment, the level(s) of access to the work area 122 are set or updated when a particular part 113, feature 116 or feature type is loaded or imported into the model or component design 114, and may cause one or more levels of access to revert back to one or more defaults.

In one embodiment, the user is able to interact with a hierarchical list of features 116 or part tree in a design space window or graphical user interface (GUI) to set or otherwise designate one or more levels of access. One or more attributes of the component design 114, feature 116 and/or feature type, for example, may be set or updated to indicate the level(s) of access. In other embodiments, the user is able to select or indicate one or more specific features by indicating a corresponding unique identifier or name.

In another embodiment, the user is able to interact with the CAx environment 112 by zooming in on a particular spatial region corresponding to the viewing frustum 115, and then set the level(s) of access of that particular spatial region or various aspects of a component design 114 in that region.

In some embodiments, the user is able to select a spatial region or portion of the design space by utilizing various geometrical selectors. The geometrical selector may be one or more data points or coordinates, various two dimensional shapes such as rectangles, ellipses or other complex shapes, or various three dimensional shapes such as boxes, spheres or other complex volumes, for example. In other embodiments, the user is able to interact with the component design 114 to select one or more portions as geometrical selectors, such as a face or edge geometry 118 of a feature 116. The particular geometrical selectors may be provided based on the needs of the particular situation.

In some embodiments, the user is able to select a partial feature or sub-feature 116 to control one or more levels of access. For example, the user may select a face 118x of feature 116c, but not other portions of the feature 116c such as face 118y, shown in FIG. 2B. The user may then choose to permit access to the portion of the feature 116 such as face 118x, but limit or deny access to other portions of the feature 116 such as face 118y. This technique permits users to collaborate on various portions of the component design 114 to ensure integration of the various features, but limits access to other areas of the component design 114 that may be protected due to one or more policies.

Figure 4:
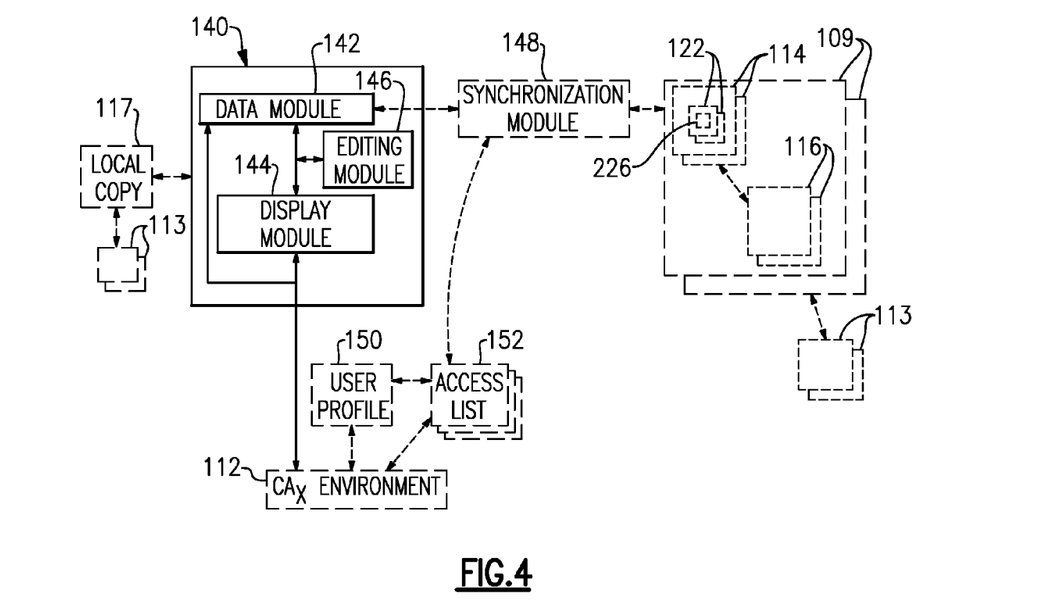
FIG. 4 illustrates a system for collaborating on a component, according to an embodiment.

Other techniques for setting or otherwise determining the level(s) of access may be utilized. FIG. 4 illustrates a CAx package 140 for collaborating on a component design utilizing different levels of access, according to an embodiment. In some embodiments, the multiple users or entities provided with a CAx environment 112 are assigned with different level(s) of access to the component design 114 via one or more profiles 150 which can be organized by one or more groups. Each profile 150 corresponds to a physical user, such as a user operating one of the client computers 104, a user account, an instance of a CAx environment 112, or a computing device configured to execute a CAx tool or CAx environment 112, for example. In one embodiment, different levels of access are designated for users that are restricted from access due to export controls, security classification or proprietary restrictions, for example. Other restricted and unrestricted levels of access may also be utilized, including job disciplines, and organization structures or entities, for example. Accordingly, it may be desirable to limit the access, display and/or ability to modify a particular work area 122 aspect of a component design 114 depending on the level(s) of access corresponding to a particular profile 150. Various aspects of a component design 114 can likewise be assigned to or designated by any of these levels of access or permissions, for example, depending on the needs of a particular situation.

In some embodiments, each profile 150 corresponds to one or more access lists 152 setting or otherwise designating one or more levels of access for each profile 150 or group of profiles, or at least some profiles 150 and/or group of profiles. The work area 122 or component design 114, or various aspects of the component design 114 including the feature(s) 116 or feature type(s), can be associated with one or more of the level(s) of access, for example. In other embodiments, access rights or permissions are set or otherwise designated for each database entry corresponding to an assembly, component design 114, feature 116 and/or feature type, for example, which in some embodiments corresponds to a field of a particular database record or entry.

The CAx package 140 is configured to access, edit and/or display data corresponding to at least one component design in a CAx environment, such as one of the CAx environments 112a, 112b. In some embodiments, the CAx package 140 is provided as a portion of a CAx software tool. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules to interact with a component design. Each of these modules includes executable software instructions and/or digital or analog hardware circuitry.

The CAx package 140 includes a data module 142 configured to access, retrieve and/or store data corresponding to one or more component designs 114. In some embodiments, the data is stored in one or more databases 109 as one or more tables, records or entries. In other embodiments, the data is stored in one or more part files 113 and is accessible by referencing one or more objects or memory locations referenced by or linked to the one or more records or entries. In one embodiment, each part file 113 or record includes data corresponding to at least one feature 116, such as any of the feature types discussed in this disclosure. In other embodiments, each database 109 organizes the data in one or more tables that include a list of part files 113 linked to a list of features 116 corresponding to a component design 114 and/or part file 113, and a list of feature types corresponding to the features 116, for example.

In one embodiment, the data module 142 is configured to create a local copy 117 of the data, which is updated or synchronized with modifications to various aspects of the component design 114 periodically or in real-time utilizing various techniques. In some embodiments, the local copy 117 includes one or more segments, data containers, partitions, or part files 113 configured to store data in different data formats. In one embodiment, the data module 142 is configured to cache data such that accessing the database 109 does not cause data corresponding to additions or changes to the component design(s) 114 and/or corresponding feature(s) 116 in the local copy 117 to update unless at least one predefined condition is met, such as by the utilization of a checkpoint or timestamp set for the corresponding component model(s) 114, for example. In some embodiments, the data module 142 is configured to reload the local copy 117 with data from the database 109.

In some embodiments, the CAx package 140 includes a display module 144 configured to display data corresponding to one or more component models 114 and/or one or more features 116 in a CAx environment 112 within a viewing frustum, such as in one of the viewing frustums 115a, 115b of CAx environments 112a, 112b. The display module 144 may be configured to display data corresponding to a work area 122 according to one or more levels of access. In one embodiment, the display module 144 is configured to display data according to the local copy 117. In some embodiments, the display module 144 is configured to selectively display one or more graphical user interfaces (GUIs) operable to cause various CAx functions provided by the CAx environment 112 and related CAx tools to execute, including the creation, editing or deletion of various aspects of a component design. The GUIs may be organized according to the needs of a particular situation in accordance with the teachings herein.

In some embodiments, the CAx package 140 includes an editing module 146 configured to create, edit or otherwise interact with data corresponding to various aspects of the component design 114. In some embodiments, the editing module 146 selectively causes the data module 142 to access data corresponding to the component design 114 from the database 109, and in other embodiments, selectively causes the data module 142 to store the data to the local copy 117 such that the user is able to view, create and/or edit various aspects of the component design 114 within the CAx environment 112. The editing module 146 may be configured to create and/or edit data corresponding to a work area 122 according to one or more levels of access.

In some embodiments, the data module 142 interfaces or otherwise communicates with a synchronization module 148 to control access to a work area 122 or portion 126 of a work area 122 in a database 109 or another location based on one or more levels of access, including any of the techniques discussed herein. The synchronization module 148 is configured to communicate data corresponding to component design 114 between the database 109 and one or more client multi-user CAx environments 112. The data may be communicated in separate data messages, objects or links, or part files 113, for example. In some embodiments, the host computer 102 provides the synchronization module 148 as one or more software services. In another embodiment, each of the client computers 104 is operable to execute an instance of the synchronization module 148. In one embodiment, a single computing platform such as the host computer 102 or one of the client computers 104 is configured to execute the data module 142 and/or the synchronization module 148. The data module 142 and/or database 109 may be configured to store data relating to the work area 122 according to the levels of access.

Various criteria for controlling access to one or more work areas 122 may be utilized. In some embodiments, the synchronization module 148 is configured to communicate data corresponding to a work area 122 based on at least one predetermined criterion. The criterion is set or otherwise designated by a user provided with the functionality of the CAx package 140, either manually during execution of a CAx environment 112, such as by one or more graphical user interfaces (GUI), or at system configuration or runtime, for example.

In some embodiments, the predetermined criterion are based on the level(s) of access indicated by a multi-user CAx server or administrator, or a user provided with a CAx environment 112, such as one of the users 221, 223, 224, 225, and 227 shown in FIG. 3. The level(s) of access can be set or otherwise designated by the user utilizing any of the techniques discussed herein, and may be set before, during or after loading the component design 114 in the CAx environment 112.

In other embodiments, the at least one predetermined criterion relates to a user profile such as the user profile 150. In one embodiment, the predetermined criterion is based on the access list 152 corresponding to one or more profiles, such as a user profile 150, or group of user profiles, provided with a CAx environment 112. The user profile 150 corresponds to a physical user, such as a user operating one of the client computers 104, an instance of a CAx environment 112, or a computing device configured to execute a CAx tool, for example. The synchronization module 148 is configured to provide access to a work area 122 in response to querying one or more access lists 152 to determine the level(s) of access of a particular profile 150 requesting access to the work area 122.

In one embodiment, the at least one predetermined criterion is met when the user profile 150 is authorized to access the work area 122 or relevant portions 126 of the work area 122, such as particular component designs 114, part files 113, features 116 and/or feature types, each of which may be designated with different levels of access. In another embodiment, the predetermined criterion is based on at least one layer corresponding to at least one feature or featured type. In some embodiments, the at least one predetermined criterion is based on at least one of a part identifier and an assembly identifier, each of which corresponds to a part file or a component design. For example, the assembly identifier may correspond to a group of different parts, each part associated with a part identifier. In some embodiments, the synchronization module 148 evaluates the levels of access according to more than one predetermined criterion, such as any of those discussed in this disclosure.

Figure 5:
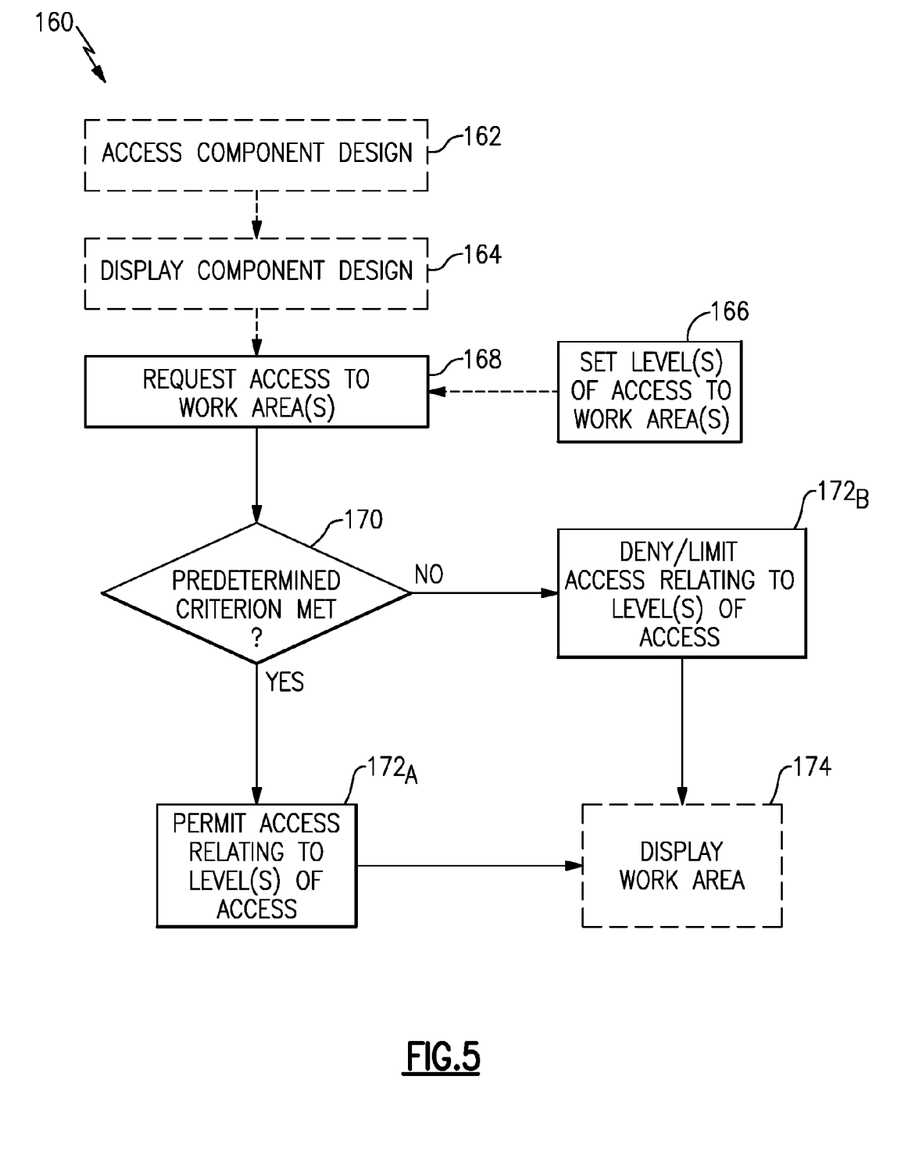
FIG. 5 illustrates an algorithm for controlling access to a work area, according to an embodiment.

FIG. 5 illustrates a control algorithm 160 in a flowchart 160 for controlling access to a work area or another portion of a component design, utilizing the CAx package 140 and any of the techniques described in this disclosure according to algorithm 160. In some embodiments, a CAx environment accesses data corresponding to a component design from at least one database at block 162, and displays data corresponding to the component design at block 164.

One or more levels of access corresponding to the work area(s) are set at block 166. A user provided with a CAx environment requests access to one or more work areas at block 168, which may relate to one or more of the levels of access, including any of the levels discussed herein. The algorithm 160 determines whether one or more predetermined criterion are met at block 170, including any of the predetermined criterion discussed herein. At block 172A the algorithm 160 may permit access to the work area relating to one or more levels of access, and at block 172B may deny access to the work area relating to one or more levels of access, depending on the level(s) of access requested at block 168. At block 174 a CAx environment displays or otherwise interacts with the work area based on the whether the request for access to the work area is permitted and/or denied at blocks 172A, 172B.

The algorithm 160 can be programmed in the CAx software directly, provided as one or more software plug-ins adapted to work with the native CAx software, or be provided in a standalone program to interface with a CAx package to provide the desired solution. While the CAx package 140 and the algorithm 160 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running the multi-user CAx environment 112 can be programmed with multiple additional tools, and the various features and tools included can be configured to interoperate with each other according to known principles.

Although the discussed embodiments illustrate a specific component, embodiments of this disclosure are not limited to those particular combinations. One skilled in the art having the benefit of this disclosure will recognize that it is possible to use some of the components or features from one of the embodiments in combination with features or components from another one of the embodiments. Furthermore, various embodiments may include one or more embodiments within them, while other embodiments may include a different sub-embodiment. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclo-

What is claimed is:

1. A system for collaborating on a component, comprising:
   a computing device configured to execute a first multi-user computer-aided technologies (CAx) environment including a data module, a display module and an editing module, the first multi-user CAx environment corresponding to a first profile;
   wherein the data module is configured to access data relating to a component design in a database, the component design including a plurality of features each associated with one or more feature types, the database relating to a group of function-based commands, the editing module is configured to edit data corresponding to the component design, and the display module is configured to display data corresponding to the component design;
   a synchronization module configured to cause the data module to access at least one work area relating to the component design according to one of at least three access levels when at least one predetermined criterion is met, and another one of the at least three access levels when the at least one predetermined criterion is not met, the database configured to store data relating to the at least one work area according to the at least three access levels;
   wherein the at least one work area includes a first area and a second area;
   wherein the at least three access levels includes at least a first level, a second level, a third level, and a fourth level, the fourth level being write access to the first area and any feature of the plurality of features that crosses a boundary between the first area and the second area; and
   wherein the first profile is associated with the fourth level for the first area and another one of the at least three access levels for the second area.

2. The system as recited in claim 1, wherein the at least one work area is at least partially based on at least one geometrical selector.

3. The system as recited in claim 2, wherein the plurality of features each having a plurality of sub-features, and the at least one work area is defined in response to a second, different multi-user CAx environment interacting with the at least one geometrical selector to select a single one of the plurality of sub-features.

4. The system as recited in claim 1, wherein the at least one predetermined criterion is at least partially based on an access list, and the first profile is characterized by the access list.

5. The system as recited in claim 1, wherein data in the at least one work area is stored remotely from the computing device.

6. The system as recited in claim 5, wherein a second multi-user CAx environment is configured to execute the synchronization module.

7. The system as recited in claim 1, wherein the predetermined criterion is at least partially based on at least one of the group of function-based commands, a part identifier, and an assembly identifier each characterizing the component design.

8. The system as recited in claim 7, wherein the at least one work area and the at least one predetermined criterion are at least partially based on the group of function-based commands.

9. The system as recited in claim 1, wherein the first level is no access to the work area, the second level is read only access to the work area, and the third level is write access to the work area.

10. The system as recited in claim 9, wherein the at least three access levels includes at least a fifth level, and the fifth level is full access to each of the at least one work area.

11. The system as recited in claim 9, wherein the synchronization module is configured to update the at least three access levels corresponding to the at least one work area in response to loading into the component design a feature of the plurality of features corresponding to a predetermined feature type of the one or more feature types.

12. The system as recited in claim 11, wherein the synchronization module is configured to cause the at least one work area to revert back to a default access level corresponding to the at least three access levels in response to loading into the component design the feature of the plurality of features corresponding to the predetermined feature type.

13. A system for collaborating on a component, comprising:
   a host server including a processor and a memory storage device, the processor being configured to execute a host multi-user computer-aided technologies (CAx) environment having a synchronization module, at least one database in the memory storage device being operable to store data relating to a component design, the component design including a plurality of features each associated with one or more feature types, the component design partitioned into at least one work area;
   wherein the synchronization module is configured to cause at least one client multi-user CAx environment to interact with the at least one work area according to one of at least three access levels, and the at least one database is configured to store data relating to the at least one work area according to the at least three access levels;
   wherein the at least one work area includes a first area and a second area;
   wherein the at least three access levels includes at least a first level, a second level, a third level, and a fourth level, the fourth level being write access to the first area and any feature of the plurality of features that crosses a boundary between the first area and the second area; and
   wherein the at least one client multi-user CAx environment is associated with the fourth level for the first area and another one of the at least three access levels for the second area.

14. The system as recited in claim 13, wherein the first level is no access to the at least one work area, the second level is read only access to the at least one work area, and the third level is write access to the at least one work area.

15. The system as recited in claim 14, wherein the at least three access levels includes at least a fifth level, and the fifth level is full access to each of the at least one work area.

16. The system as recited in claim 15, wherein the plurality of features each having a plurality of sub-features, the at least one work area defined by a portion of the plurality of features, and the at least one work area is defined in response to a second, different multi-user CAx environment interacting with at least one geometrical selector to select a single one of the plurality of sub-features.

17. The system as recited in claim 13, wherein the at least one work area includes a first portion and a second portion, and the wherein the synchronization module is configured to cause at least one client multi-user CAx environment to access the second portion according to one of at least three access levels corresponding to the first portion.

18. A method for designing a component, comprising the steps of:

accessing at least one work area in a database according to one of at least three access levels, the work area relating to a component design, the component design including a plurality of features each associated with one or more feature types, and the database configured to store data relating to the at least one work area according to the at least three access levels, the at least one work area including a first area and a second area, the at least three access levels including at least a first level, a second level, a third level, and a fourth level, the fourth level being write access to the first area and any feature of the plurality of features that crosses a boundary between the first area and the second area, the multi-user CAx environment being associated with the fourth access level for the first area and another one of the at least three access levels for the second area;

editing a feature of the plurality of features that crosses the boundary between the first area and the second area;

displaying on an output device the component design in a multi-user computer-aided technologies (CAx) environment; and displaying on the output device the at least one work area in the multi-user CAx environment based upon the at least three access levels.

19. The method as recited in claim 18, wherein the first level is no access to the at least one work area, the second level is read only access to the at least one work area, and the third level is write access to the at least one work area.

20. The method as recited in claim 18, further comprising:

accessing a first portion of the at least one work area according to a first one of the at least three access levels; and accessing a second portion of the at least one work area according to a second one of the at least three access levels.

21. The method as recited in claim 18, wherein the at least three access levels includes at least a fifth level, the fifth level is full access to each of the at least one work area, and the step of accessing includes accessing the first work area according to the fourth level and accessing the second area according to one of the first access level, the second access level, and the third access level.

\* \* \* \* \*

UNITED STATES PATENT AND TRADEMARK OFFICE
CERTIFICATE OF CORRECTION

PATENT NO. : 9,871,796 B1
APPLICATION NO. : 14/617994
DATED : January 16, 2018
INVENTOR(S) : William A. Sowa and Charles Gregory Jensen Page 1 of 1

It is certified that error appears in the above-identified patent and that said Letters Patent is hereby corrected as shown below:

In the Claims

In Claim 18, Column 15, Line 23-24; replace "the multi-user CAx environment" with --a multi-user computer-aided technologies (CAx) environment--

In Claim 18, Column 16, Line 3-4; replace "a multi-user computer-aided technologies (CAx)" with --the multi-user computer-aided technologies (CAx)--

In Claim 21, Column 16, Line 23; replace "the first work area" with --the first area--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*